United States Patent
Tabor (10) Patent No.: US 6,775,974 B2
(45) Date of Patent: Aug. 17, 2004

(54) VELOCITY BASED METHOD OF CONTROLLING AN ELECTROHYDRAULIC PROPORTIONAL CONTROL VALVE

(75) Inventor: Keith A. Tabor, Richfield, WI (US)

(73) Assignee: HUSCO International, Inc., Waukesha, WI (US)

(*) Notice: Subject to any disclaimer, the term of this patent is extended or adjusted under 35 U.S.C. 154(b) by 64 days.

(21) Appl. No.: 10/254,170

(22) Filed: Sep. 25, 2002

(65) Prior Publication Data

US 2004/0055453 A1 Mar. 25, 2004

(51) Int. Cl.$^7$ .................................................. F16D 31/02
(52) U.S. Cl. ................................... 60/422; 91/435
(58) Field of Search ............................ 60/422; 91/435

(56) References Cited

U.S. PATENT DOCUMENTS

| | | |
|---|---|---|
| 3,954,046 A | 5/1976 | Stillhard |
| 4,061,155 A | 12/1977 | Sopha |
| 4,250,794 A | 2/1981 | Haak et al. |
| 4,437,385 A | 3/1984 | Kramer et al. |
| 5,201,177 A | 4/1993 | Kim |
| 5,249,140 A | 9/1993 | Kessler |
| 5,490,384 A | 2/1996 | Lunzman |
| 5,666,806 A | 9/1997 | Dietz |
| 5,701,793 A | 12/1997 | Gardner et al. |
| 5,878,647 A | 3/1999 | Wilke et al. |
| 5,947,140 A | 9/1999 | Aardema et al. |
| 5,960,695 A | 10/1999 | Aardema et al. |
| 6,282,891 B1 | 9/2001 | Rockwood |

OTHER PUBLICATIONS

Arne Jansson, et al., "Separate Controls of Meter–in and Meter–out Orifices in Mobile Hyraulic Systems," SAE Technical Papers Series, Sep. 1999, pp. 1–7, SAE International, Warrendale, PA.

*Primary Examiner*—Edward K. Look
*Assistant Examiner*—Michael Leslie
(74) *Attorney, Agent, or Firm*—George E. Haas; Quarles & Brady LLP (57) ABSTRACT

An actuator is part of a hydraulic circuit branch that has a first electrohydraulic proportional valve connecting the actuator to a supply line containing pressurized fluid and a second electrohydraulic proportional valve connecting the actuator to a tank return line. A method for operating the valves includes requesting a desired velocity for the hydraulic actuator and sensing a parameter which varies with changes of a force on the actuator. The desired velocity and the parameter are used to derive an equivalent flow coefficient which characterizes fluid flow in the hydraulic circuit. From the equivalent flow coefficient, first and second valve flow coefficient are derived and then employed to activate each of the first and second electrohydraulic proportional valves. The coefficients may characterize either conductance or restriction in the respective part of the hydraulic system.

45 Claims, 2 Drawing Sheets

VELOCITY BASED METHOD OF CONTROLLING AN ELECTROHYDRAULIC PROPORTIONAL CONTROL VALVE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to hydraulic systems for operating machinery, and in particular to algorithms for controlling electrohydraulic valves in such systems.

2. Description of the Related Art

A wide variety of machines have moveable members which are operated by an hydraulic actuator, such as a cylinder and piston arrangement, that is controlled by a hydraulic valve. Traditionally the hydraulic valve was manually operated by the machine operator. There is a present trend away from manually operated hydraulic valves toward electrical controls and the use of solenoid operated valves. This type of control simplifies the hydraulic plumbing as the control valves do not have to be located near an operator station, but can be located adjacent the actuator being controlled. This change in technology also facilitates sophisticated computerized control of the machine functions.

Application of pressurized hydraulic fluid from a pump to the actuator can be controlled by a proportional solenoid operated spool valve that is well known for controlling the flow of hydraulic fluid. Such a valve employs an electromagnetic coil which moves an armature connected to the spool that controls the flow of fluid through the valve. The amount that the valve opens is directly related to the magnitude of electric current applied to the electromagnetic coil, thereby enabling proportional control of the hydraulic fluid flow. Either the armature or the spool is spring loaded to close the valve when electric current is removed from the solenoid coil. Alternatively a second electromagnetic coil and armature is provided to move the spool in the opposite direction.

When an operator desires to move a member on the machine a joystick is operated to produce an electrical signal indicative of the direction and desired rate at which the corresponding hydraulic actuator is to move. The faster the actuator is desired to move the farther the joystick is moved from its neutral position. A control circuit receives a joystick signal and responds by producing a signal to open the associated valve. A solenoid moves the spool valve to supply pressurized fluid through an inlet orifice to the cylinder chamber on one side of the piston and to allow fluid being forced from the opposite cylinder chamber to drain through an outlet orifice to a reservoir, or tank. A hydromechanical pressure compensator maintains a nominal pressure (margin) across the inlet orifice portion of the spool valve. By varying the degree to which the inlet orifice is opened (i.e. by changing its valve coefficient), the rate of flow into the cylinder chamber can be varied, thereby moving the piston at proportionally different speeds. Thus prior control methods were based primarily on inlet orifice metering using an external hydromechanical pressure compensator.

Recently a set of proportional solenoid operated pilot valves has been developed to control fluid flow to and from the hydraulic actuator, as described in U.S. Pat. No. 6,149,124. In these valves, the solenoid armature acts on a pilot poppet that controls the flow of fluid through a pilot passage in a main valve poppet. The armature is spring loaded to close the valve when electric current is removed from the solenoid coil.

The control of an entire machine, such as an agricultural tractor or construction equipment is complicated by the need to control multiple functions simultaneously. For example, in order to operate a back hoe, hydraulic actuators for the boom, arm, bucket, and swing have to be simultaneously controlled. The loads acting on each of those machine members often are significantly different so that their respective actuators require hydraulic fluid at different pressures. The pump often is a fixed displacement type with the outlet pressure being controlled by an unloader. Therefore, the unloader needs to be controlled in response to the function requiring the greatest pressure for its actuator. In some cases the pump may be incapable of supplying enough hydraulic fluid for all of the simultaneously operating functions. At those times it is desirable that the control system allocate the available hydraulic fluid among those functions in an equitable manner, taking into account that some function may deserve fluid on a higher priority than other functions.

SUMMARY OF THE INVENTION

A circuit branch of a hydraulic system has an electrohydraulic proportional valve connected in series with a hydraulic actuator between a supply line containing pressurized fluid and a return line connected to a tank. The present method for operating the electrohydraulic proportional valve comprises requesting a desired velocity for the hydraulic actuator. Such a request may emanate from an operator input device for the machine on which the hydraulic circuit is a component. A parameter, which varies with changes in a force acting on the hydraulic actuator, is sensed to provide an indication of that force. For example, this parameter may be pressure at the hydraulic actuator.

A valve flow coefficient, characterizing fluid flow through the electrohydraulic proportional valve that is required to achieve the desired velocity, is derived based on the desired velocity and the sensed parameter. In a preferred embodiment of the present method, this derivation comprises using the desired velocity and the sensed parameter to produce an equivalent flow coefficient that characterizes the fluid flow in the entire hydraulic circuit branch. The valve flow coefficient for the electrohydraulic proportional valve then is determined from that equivalent flow coefficient. Activation of the electrohydraulic proportional valve is performed based on the valve flow coefficient.

One type of hydraulic circuit with which the present method may be used has a first valve coupling the actuator to a supply line containing pressurized fluid and a second valve coupling the actuator to a tank return line. Another aspect of the present method also specifies a preferred relationship between a flow coefficient for the first valve and a flow coefficient for the second valve. Here, the valve flow coefficients derived for each of the first and second valves from the equivalent flow coefficient, also satisfy the preferred relationship.

Other refinements of the basic method may be implemented to control one or both actuator port pressures (e.g. to inhibit cavitation from occurring on the inlet port).

DETAILED DESCRIPTION OF THE INVENTION

Figure 1:
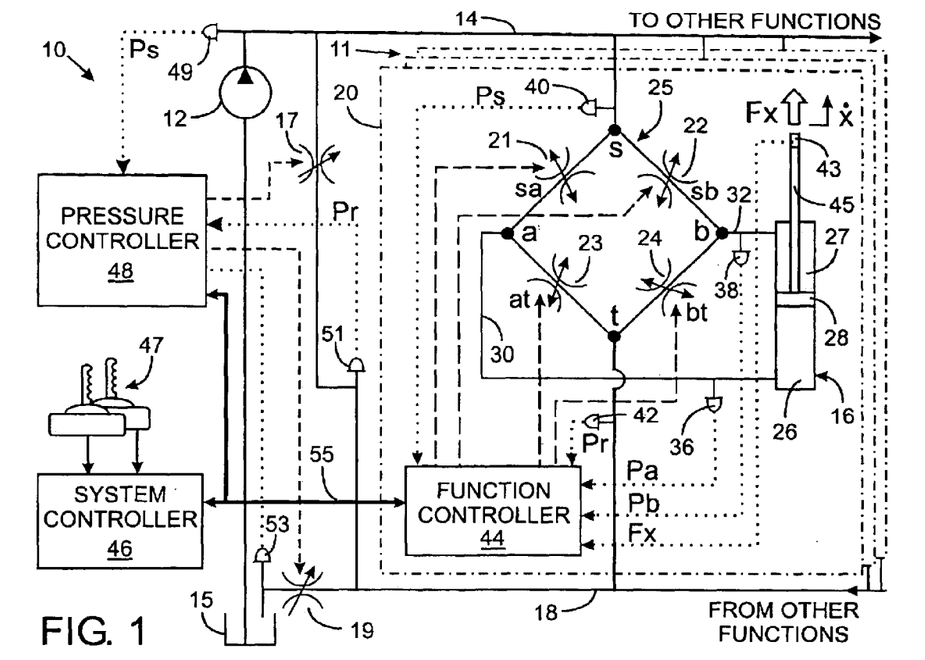
FIG. 1 is a schematic diagram of an exemplary hydraulic system incorporating the present invention.

With initial reference to FIG. 1, a hydraulic system 10 of a machine has mechanical elements operated by hydraulically driven actuators, such as cylinder 16 or rotational motors. The hydraulic system 10 includes a positive displacement pump 12 that is driven by a motor or engine (not shown) to draw hydraulic fluid from a tank 15 and furnish the hydraulic fluid under pressure to a supply line 14. It should be understood that the novel techniques for performing velocity control being described herein also can be implemented on a hydraulic system that employs a variable displacement pump and other types of hydraulic actuators. The supply line 14 is connected to a tank return line 18 by an unloader valve 17 (such as a proportional pressure relief valve) and the tank return line 18 is connected by tank control valve 19 to the system tank 15.

The supply line 14 and the tank return line 18 are connected to a plurality of hydraulic functions on the machine on which the hydraulic system 10 is located. One of those functions 20 is illustrated in detail and other functions 11 have similar components. The hydraulic system 10 is of a distributed type in that the valves for each function and control circuitry for operating those valves are located adjacent to the actuator for that function. For example, those components for controlling movement of the arm with respect to the boom of a backhoe are located at or near the arm cylinder or the junction between the boom and the arm.

In the given function 20, the supply line 14 is connected to node "s" of a valve assembly 25 which has a node "t" that is connected to the tank return line 18. The valve assembly 25 includes a workport node "a" that is connected by a first hydraulic conduit 30 to the head chamber 26 of the cylinder 16, and has another workport node "b" that is coupled by a second conduit 32 to the rod chamber 27 of cylinder 16. Four electrohydraulic proportional valves 21, 22, 23, and 24 control the flow of hydraulic fluid between the nodes of the valve assembly 25 and thus control fluid flow to and from the cylinder 16. The first electrohydraulic (EH) proportional valve 21 is connected between nodes s and a, and is designated by the letters "sa". Thus the first electrohydraulic proportional valve 21 can control the flow of fluid between the supply line 14 and the head chamber 26 of the cylinder 16. The second electrohydraulic proportional valve 22, designated by the letters "sb", is connected between nodes "s" and "b" and can control fluid flow between the supply line 14 and the cylinder rod chamber 27. The third electrohydraulic proportional valve 23, designated by the letters "at", is connected between node "a" and node "t" and can control fluid flow between the head chamber 26 and the return line 18. The fourth electrohydraulic proportional valve 24, which is between nodes "b" and "t" and designated by the letters "bt", can control the flow between the rod chamber 27 and the return line 18.

The hydraulic components for the given function 20 also include two pressure sensors 36 and 38 which detect the pressures Pa and Pb within the head and rod chambers 26 and 27, respectively, of cylinder 16. Another pressure sensor 40 measures the pump supply pressure Ps at node "s", while pressure sensor 42 detects the return line pressure Pr at node "t" of the function 20. The sensors should be placed as close to the valve as possible to minimize velocity errors due to line loss effects. It should be understood that the various pressures measured by these sensors may be slightly different from the actual pressures at these points in the hydraulic system due to line losses between the sensor and those points. However the sensed pressures relate to and are representative of the actual pressures and accommodation can be made in the control methodology for such differences. Furthermore, pressure sensors 40 and 42 may not be present on all functions 11.

The pressure sensors 36, 38, 40 and 42 for the function 20 provide input signals to a function controller 44 which produces signals that operate the four electrohydraulic proportional valves 21–24 as will be described. The function controller 44 is a microcomputer based circuit which receives other input signals from a computerized system controller 46, as will be described. A software program executed by the function controller 44 responds to those input signals by producing output signals that selectively open the four electrohydraulic proportional valves 21–24 by specific amounts to properly operate the cylinder 16.

The system controller 46 supervises the overall operation of the hydraulic system exchanging signals with the function controllers 44 and a pressure controller 48. The signals are exchanged among the three controllers 44, 46 and 48 over a communication network 55 using a conventional message protocol. The pressure controller 48, which is located on the machine near the pump 12, receives signals from a supply line pressure sensor 49 at the outlet of the pump, a return line pressure sensor 51, and a tank pressure sensor 53. In response to those pressure signals and commands from the system controller 46, the pressure controller 48 operates the tank control valve 19 and the unloader valve 17. However, if a variable displacement pump is used, the pressure controller 48 controls the pump.

Figure 2:
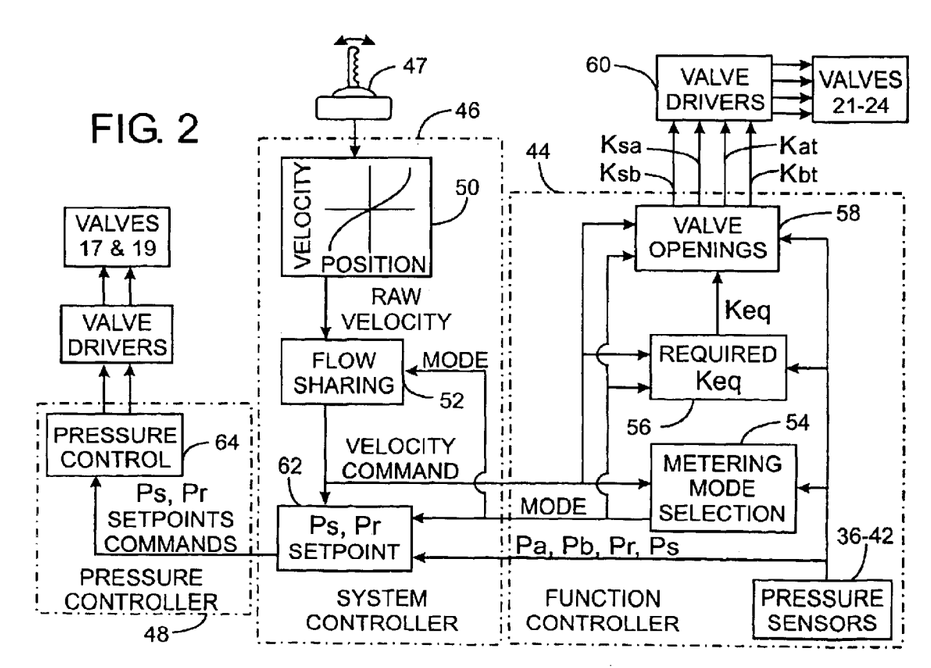
FIG. 2 is a control diagram for the hydraulic system.

With reference to FIG. 2, the control functions for the hydraulic system 10 are distributed among the different controllers 44, 46 and 48. Considering a single function 20, the output signals from the joystick 47 for that function are applied as input signals to the system controller 46. Specifically, the output signal from the joystick 47 is applied to a mapping routine 50 which converts the signal indicating the joystick position into a signal indicating a desired velocity for the hydraulic actuator being controlled. The mapping function can be linear or have other shapes as desired. For example, the first half of the travel range of the joystick from the neutral center position may map to the lower quartile of velocities, thus providing relatively fine control of the actuator at slow velocity. In that case, the latter half of the joystick travel maps to the upper 75 percent range of the velocities. The mapping routine may be implemented by an arithmetic expression that is solved by the computer within system controller 46, or the mapping may be accomplished by a look-up table stored in the controller's memory. The output of the mapping routine 50 is a signal indicative of the raw velocity desired by the system user.

In an ideal situation, desired velocity is used to control the hydraulic valves associated with this function. However, in many instances, the desired velocity may not be achievable in view of the simultaneous demands placed on the hydraulic system by other functions 11 of the machine. For example, the total quantity of hydraulic fluid flow demanded by all of the functions may exceed the maximum output of the pump 12, in which case, the control system must apportion the available quantity among all the functions demanding hydraulic fluid, and a given function may not be able to operate at the full desired velocity. As a consequence, the raw velocities are applied to a flow sharing software routine 52, which compares the amount of fluid available for powering the machine to the total amount of fluid being demanded by the presently active hydraulic functions.

In order for the flow sharing routine to apportion the available fluid, the metering mode of each function must be known, as those modes, along with the velocity of each function, determine the demanded amounts of fluid and contribute to the aggregate flow of fluid available to power the functions. In the case of functions that operate a hydraulic cylinder and piston arrangement, such as cylinder 16 and piston 28 in FIG. 1, it is readily appreciated that in order to extend the piston rod 45 from the cylinder, hydraulic fluid must be supplied to the head chamber 26, and fluid must be supplied to the rod chamber 27 to retract the piston rod 45. However, because the piston rod 45 occupies some of the volume of the rod chamber 27, that chamber requires less hydraulic fluid to produce an equal amount of motion of the piston than is required by the head chamber. As a consequence, whether the actuator is in the extend or retract mode determines different amounts of fluid that are required at a given speed.

The fundamental metering modes in which fluid from the pump is supplied to one of the cylinder chambers 26 or 27 and drained to the return line from the other chamber are referred to as powered metering modes, specifically powered extension or powered retraction. Hydraulic systems also employ regeneration (regen) metering modes in which fluid being drained from one cylinder chamber is fed back through the valve assembly 25 to supply the other cylinder chamber.

In a regeneration mode, the fluid can flow between the chambers through either the supply line node "s", referred to as "high side regeneration" or through the return line node "t" in "low side regeneration". It should be understood that in a regeneration mode, when fluid is being forced from the head chamber 26 into the rod chamber 27 of a cylinder, a greater volume of fluid is draining from the head chamber than is required in the smaller rod chamber. During a retraction in the low side regeneration mode, that excess fluid flows to the return line 18 from which it continues to flow either to the tank 15 or to other functions 11 operating in the low side regeneration mode and requiring more fluid.

Regeneration also can occur when the rod 45 is being extended from the cylinder 16. In this case, an insufficient volume of fluid is exhausting from the smaller rod chamber 27 than is required to fill the head chamber 26. During an extension in the low side regeneration mode, the function has to receive additional fluid from the tank return line 18. That additional fluid either originates from another function, or from the pump 12 through the unloader valve 17. It should be understood that in this case, the tank control valve 19 is at least partially closed to restrict fluid in the return line 18 from flowing to the tank 15, so that fluid is supplied from another function 11 or indirectly from the pump 12. When the high side regeneration mode is used to extend the rod, the additional fluid comes from the pump 12.

In order to determine whether sufficient supply flow exists from all sources to produce the desired function velocities, the flow sharing routine 52 receives indications as to the metering mode of all the active functions. The flow sharing routine then compares the total supply flow of fluid to the total flow that would be required if every function operated at the desired velocity. The result of this processing is a set of velocity commands for the presently active functions. This determines the velocity at which the associated function will operate (a velocity command) and the commanded velocity may be less than the velocity desired by the machine operator, when there is insufficient supply flow. The flow sharing algorithm also may assign different priorities to the machine functions. Therefore, when there is an insufficient fluid supply to power all the active functions at their desired velocities, a greater proportion of the available fluid is sent to functions having a higher priority thus those functions will operate closer to their desired velocities than lower priority functions.

Each velocity command then is sent to the function controller 44 for the associated function 11 or 20. As will be recalled, the function controller 44 operates the electrohydraulic proportional valves, such as valves 21–24, which control the hydraulic actuator for that function. The metering mode for a particular function is determined by a metering mode selection routine 54 executed by the function controller 44 of the associated hydraulic function. The metering mode selection routine 54 can be a manual input device which is operable by the machine operator to determine the mode for a given function. Alternatively, an algorithm can be implemented by the function controller 44 to determine the optimum metering mode for that function at a particular point in time. For example, the metering mode selection component may receive the cylinder chamber pressures Pa and Pb along with the supply and return lines pressures Ps and Pr at the particular function. Once selected, the metering mode is communicated to the system controller 46 and other routines of the respective function controller 44.

Valve Control

The remaining routines 56 and 58 executed by the function controller 44 determine how to operate the electrohydraulic proportional valves 21–24 to achieve the commanded velocity, desired workport pressure(s), and to minimize velocity errors due to non-ideal valves. In each metering mode, only two of the electrohydraulic proportional valves in assembly 25 are active, or open. The two valves in the hydraulic circuit branch for the function can be modeled by a single equivalent coefficient, Keq, representing the equivalent fluidic conductance of the hydraulic circuit branch in the selected metering mode. The exemplary hydraulic circuit branch for function 20 includes the valve assembly 25 connected to the cylinder 16. The equivalent conductance coefficient, Keq, then is used to calculate individual valve conductance coefficients, which characterize fluid flow through each of the four electrohydraulic proportional valves 21–24 and thus the amount, if any, that each valve is to open. Those skilled in the art will recognize that in place of the equivalent conductance coefficient and the valve conductance coefficients the inversely related flow restriction coefficients can be used to characterize the fluid flow. Both conductance and restriction coefficients characterize the flow of fluid in a section or component of a hydraulic system and are inversely related parameters. Therefore, the generic terms "equivalent flow coefficient" and "valve flow coefficient" are used herein to cover both conductance and restriction coefficients.

The nomenclature used to describe the algorithms which determine the equivalent conductance coefficient, Keq and the individual valve conductance coefficients is given in Table 1.

TABLE 1

NOMENCLATURE

| | |
|---|---|
| a | denotes items related to head side of cylinder |
| b | denotes items related to rod side of cylinder |
| Aa | piston area in the head cylinder chamber |
| Ab | piston area in the rod cylinder chamber |
| c | denotes a critical value |
| Fx | equivalent external force on cylinder in the direction of velocity $\dot{x}$ |
| Ka | conductance coefficient for the active valve connected to node a |
| Kb | conductance coefficient for the active valve connected to node b |
| Ksa | conductance coefficient for valve sa between supply line and node a |
| Ksb | conductance coefficient for valve sb between supply line and node b |
| Kat | conductance coefficient for valve at between node a and return line |
| Kbt | conductance coefficient for valve bt between node b and return line |
| Keq | equivalent conductance coefficient |
| Kin | coefficient of a valve through which fluid flows into the cylinder |
| Kmax | maximum coefficient for a valve |
| Kout | coefficient of a valve through which fluid flows out of the cylinder |
| opt | denotes an optimum value required to minimize velocity errors |
| Pa | head chamber pressure |
| Pb | rod chamber pressure |
| Pc | critical pressure |
| pc | denotes a term that is required to obtain the critical pressure |
| Ps | supply line pressure |
| Pr | return line pressure |
| Peq | equivalent, or "driving", pressure |
| R | cylinder area ratio, Aa/Ab (R ≧ 1.0) |
| $\dot{x}$ | commanded velocity of the piston (positive in the extend direction) |

The derivation of the valve conductance coefficients employs a different mathematical algorithm depending on the metering mode for the function 20. Thus the valve control process will be described separately for each of the four metering modes.

1. Powered Extension Mode

The hydraulic system 10 can be utilized to extend the piston rod 45 from the cylinder 16 by applying pressurized hydraulic fluid from the supply line 14 to the head chamber 26 and exhausting fluid from the rod chamber 27 to the tank return line 18. This metering mode is referred to as the "Powered Extension Mode." In general, this mode is utilized when the force Fx acting on the piston 28 is negative and work must be done against that force in order to extend the piston rod 45 from cylinder 16. To produce that motion, the first and fourth electrohydraulic valves 21 and 24 are opened, while the other pair of valves 22 and 23 is kept closed. Although the present control method is being described in terms of controlling a cylinder and piston arrangement on which an external linear force acts, the methods described herein can be used to control a motor in which case the external force acting on the actuator would be expressed as a torque.

The velocity of the rod extension is controlled by metering fluid through the first and fourth valves 21 and 24. The settings of the valve conductance coefficients Ksa and Kbt for those valves, together affect the velocity of the piston rod 45, given an equivalent external force (Fx) and pressures Ps and Pr in the supply and return lines 14 and 18. In theory the specific set of values for the individual valve conductance coefficients Ksa and Kbt are irrelevant, as only the resultant mathematical combination of those two coefficients, referred to as the equivalent conductance coefficient (Keq), is of consequence. Therefore, by knowing the cylinder area ratio R, the area in the rod cylinder chamber Ab, the cylinder chamber pressures Pa and Pb, the supply and return line pressures Ps and Pr, and the commanded piston rod velocity $\dot{x}$, the function controller 44 can execute a software routine 56 to compute the required equivalent conductance coefficient Keq from the equation:

$$Keq = \frac{\dot{x} Ab}{\sqrt{R(Ps - Pa) + (Pb - Pr)}}, \dot{x} > 0 \quad (1)$$

where the various terms in this equation and in the other equations in this document are specified in Table 1. If the desired velocity is zero when using any mode, all four valves 21–24 are closed. If a negative velocity is desired, a different mode must be used. It should be understood that the calculation of the equivalent conductance coefficient Keq in any of the present control methods may yield a value that is greater than a maximum value that may be physically achievable given the constraints of the particular hydraulic valves and the cylinder area ratio R. In that case the maximum value for the equivalent conductance coefficient is used in subsequent arithmetic operations. In addition the commanded velocity also would be adjusted according to the expression: $\dot{x}$=(Keq_max/Keq) $\dot{x}$. This new velocity would then be used in all subsequent calculations.

The area Aa of the surface of the piston in the head chamber 26 and the piston surface area Ab in the rod chamber 27 are fixed and known for the specific cylinder 16 which is utilized for this function 20. Knowing those surface areas and the present pressures Pa and Pb in each cylinder chamber, the equivalent external force Fx acting on the cylinder can be determined by the function controller 44 according to either of the following expressions:

$$Fx = -Pa\, Aa + Pb\, Ab \quad (2)$$

$$Fx = Ab(-R\, Pa + Pb) \quad (3)$$

The equivalent external force (Fx) as computed from equation (2) or (3) includes the effects of external load on the cylinder, line losses between each respective pressure sensor Pa and Pb and the associated actuator port, and cylinder friction. The equivalent external force actually represents the total hydraulic load seen by the valve, but expressed as a force.

Using actuator port pressure sensors to estimate this total hydraulic load is a preferred embodiment. Note that the equations for Keq here and elsewhere use this type of hydraulic load estimate implicitly. Alternatively, a load cell 43 could be used to estimate the equivalent external force (Fx). However, in this case, since cylinder friction and workport line losses would not be taken into account, velocity errors may occur. The force Fx measured by the load cell is used in the term "Fx/Ab" which then is substituted for the terms "−RPa+Pb" in the expanded denominator of equation (1). Similar substitutions also would be made in the other expressions for equivalent conductance coefficient Keq given hereinafter.

If a rotary actuator is used, a total hydraulic load, expressed as an external torque, preferably is found using the measurements provided by the actuator port pressure sensors. Here too, an externally measured torque alternatively could be used to compute the equivalent conductance coefficient.

The driving pressure, Peq, required to produce movement of the piston rod 45 is given by:

$$Peq = R(Ps - Pa) + (Pb - Pr) \quad (4)$$

If the driving pressure is positive, the piston rod 45 will move in the intended direction (i.e. extend from the cylinder) when both the first and fourth electrohydraulic proportional valves 21 and 24 are opened. If the driving pressure is not positive, the first and fourth valves 21 and 24 must be kept closed to avoid motion in the wrong direction, until the supply pressure Ps is increased to produce a positive driving pressure Peq. If the present parameters indicate that the movement of the piston rod 45 will occur in the desired direction, the function controller 44 continues in the valve opening routine 58 by employing the equivalent conductance coefficient Keq to derive individual valve conductance coefficients Ksa, Ksb, Kat and Kbt for the four electrohydraulic proportional valves 21–24.

In any particular metering mode two of the four electrohydraulic proportional valves are closed and thus have individual valve conductance coefficients of zero. For example, the second and third electrohydraulic proportional valves 22 and 23 are closed in the Powered Extension Mode. Therefore, only the two open, or active, electrohydraulic proportional valves (e.g. valves 21 and 24) contribute to the equivalent conductance coefficient (Keq). One active valve is connected to node "a" and the other active valve to node "b" of the valve assembly 25. In the following description of that valve opening routine 58, the term Ka refers to the individual conductance coefficient for the active valve connected to node "a" (e.g. Ksa in the Powered Extension Mode) and Kb is the valve conductance coefficient for the active valve connected to node "b" (e.g. Kbt in the Powered Extension Mode). The equivalent conductance coefficient Keq is related to the individual conductance coefficients Ka and Kb according to the expression:

$$Keq = \frac{K_a K_b}{\sqrt{K_a^2 + R^3 K_b^2}} \quad (5)$$

Rearranging this expression for each individual valve conductance coefficient, yields the following expressions:

$$Ka = \frac{R^{3/2} Kb Keq}{\sqrt{Kb^2 - Keq^2}} \quad (6)$$

$$Kb = \frac{Ka Keq}{\sqrt{Ka^2 - R^3 Keq^2}} \quad (7)$$

Figure 3:
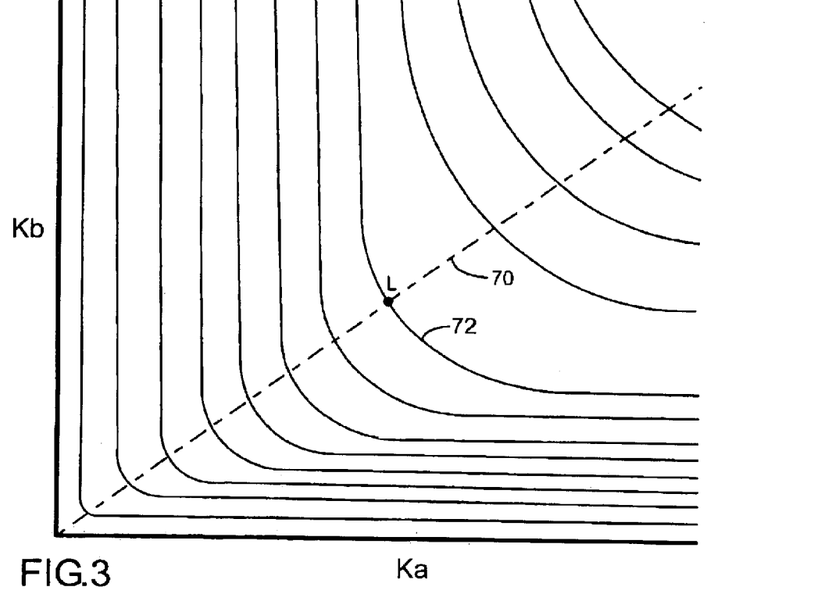
FIG. 3 depicts the relationship between flow coefficients Ka and Kb for individual valves in the hydraulic system and each solid line represents an equivalent conductance coefficient Keq.

As is apparent, there are an infinite number of combinations of values for the valve conductance coefficients Ka and Kb, which equate to a given value of the equivalent conductance coefficient Keq. FIG. 3 graphically depicts the relationship between Ka and Kb wherein each solid curve represents a constant value of Keq. Note that there are in fact an infinite number of constant Keq curves with only some of them shown on the graph.

However, recognizing that actual electrohydraulic proportional valves used in the hydraulic system are not perfect, errors in setting the values for Ka and Kb inevitably will occur, which in turn leads to errors in the controlled velocity of the piston rod 45. Therefore, it is desirable to select values for Ka and Kb for which the error in the equivalent conductance coefficient Keq is minimized because Keq is proportional to the velocity ẋ. The sensitivity of Keq with respect to both Ka and Kb can be computed by taking the magnitude of the gradient of Keq as given in vector differential calculus. The magnitude of the gradient of Keq is given by the equation:

$$|\nabla Keq(K_a, K_b)| = \sqrt{\frac{K_a^6 + R^6 K_b^6}{(K_a^2 + R^3 K_b^2)^3}} \quad (8)$$

A contour plot of the resulting two-dimensional sensitivity of Keq to valve conductance coefficients Ka and Kb has a valley in which the sensitivity is minimized for values of Ka and Kb at the bottom of the valley. The line at the bottom of that sensitivity valley is expressed by:

$$Ka = \mu Kb \quad (9)$$

where μ is the slope of the line. This line corresponds to the optimum or preferred valve conductance coefficient relationship between Ka and Kb to achieve the commanded velocity. The slope is a function of the cylinder area ratio R and can be found for a given cylinder design according to the expression $\mu = R^{3/4}$. For example, this relationship becomes Ka≅1.40 Kb for a cylinder area ratio of 1.5625. Superimposing a plot of the preferred valve conductance coefficient line 70 given by equation (9) onto the Keq curves of FIG. 3 reveals that the minimum coefficient sensitivity line intersects all the constant Keq curves.

In addition to equations (6) and (7) above, by knowing the value of the slope constant μ for a given hydraulic system function, the individual value coefficients are related to the equivalent conductance coefficient according to the expressions:

$$Ka = \sqrt{\mu^2 + R^3} \, Keq \quad (10)$$

$$Kb = \frac{\sqrt{\mu^2 + R^3} \, Keq}{\mu} \quad (11)$$

Therefore, two of expressions (6), (7), (10) and (11) can be solved to determine the valve conductance coefficients for the active valves in the current metering mode.

Returning to the specific example of function 20 operating in the Powered Extension Mode, the valve conductance coefficients Ksb and Kat for the second and third electrohydraulic proportional valves 22 and 23 are set to zero as these valves are kept closed. The individual conductance coefficients Ksa and Kbt for the active first and fourth hydraulic valves 21 and 24 are defined by the following specific applications of the generic equations (6), (7), (9), (10) and (11):

$$Ksa = \frac{R^{3/2} Kbt Keq}{\sqrt{Kbt^2 - Keq^2}} \quad (12)$$

$$Kbt = \frac{Ksa Keq}{\sqrt{Ksa^2 - R^3 Keq^2}} \quad (13)$$

$$Ksa = \mu Kbt \quad (14)$$

$$Ksa = \sqrt{\mu^2 + R^3} \, Keq \quad (15)$$

$$Kbt = \frac{\sqrt{\mu^2 + R^3} \; Keq}{\mu} \quad (16)$$

In order to operate the valves in the range of minimal sensitivity, either both equations (15) and (16) are solved or equation (16) is solved and the resultant valve conductance coefficient then is used in equation (14) to derive the other valve conductance coefficient. In other circumstances the valve conductance coefficients can be derived using equations (12) or (13). For example a value for one valve conductance coefficient can be selected and the corresponding equation (12) or (13) can be used to derive the other valve conductance coefficient. With reference to FIG. 3, if curve 72 represents the calculated equivalent conductance coefficient Keq then the valve conductance coefficients Ka and Kb are defined by the intersection of the Keq curve 72 and the preferred valve conductance coefficient line 70 at point L.

The resultant set of valve conductance coefficients Ksa, Ksb, Kat and Kbt calculated by the valve opening routine 58 are supplied by the function controller 44 to valve drivers 60. The valve drivers 60 convert those coefficients into corresponding electrical currents to open the first and fourth electrohydraulic proportional valves 21 and 24 by the proper amount to achieve the desired velocity of the piston rod 45.

It is important to note here and elsewhere that the conversion of valve coefficients to a corresponding electrical current implicitly depends upon properties of the type of hydraulic fluid used. As a particular hydraulic fluid is specified for a given system and it is generally recommended that another type of fluid is not used, the validity of the valve coefficients for only a specific type of hydraulic fluid typically is not a concern. The algorithm used in that conversion can be changed should it become necessary to use a different type of hydraulic fluid.

2. Powered Retraction Mode

The piston rod 45 can be retracted into the cylinder 16 by applying pressurized hydraulic fluid from the supply line 14 to the rod chamber 27 and exhausting fluid from the head chamber 26 to the tank return line 18. This metering mode is referred to as the "Powered Retraction Mode". In general, this mode is utilized when the force acting on the piston 28 is positive and work must be done against that force to retract the piston rod 45. To produce this motion, the second and third electrohydraulic valves 22 and 23 are opened, while the other pair of electrohydraulic proportional valves 21 and 24 are kept closed.

The velocity of the rod retraction is controlled by metering fluid through both the second and third electrohydraulic proportional valves 22 and 23 as determined by the corresponding valve conductance coefficients Ksb and Kat. This control process is similar to that just described with respect to the Powered Extension Mode. Initially the function controller 44 uses routine 56 to calculate the equivalent conductance coefficient (Keq) according to the equation:

$$Keq = \frac{-\dot{x}Ab}{\sqrt{R(Pa-Pr)+(Ps-Pb)}}, \dot{x}<0 \quad (17)$$

The driving pressure, Peq, required for producing movement of the piston rod 45 is given by:

$$Peq = R(Pa-Pr)+(Ps-Pb) \quad (18)$$

If the driving pressure is positive, the piston rod 45 will retract into the cylinder when both the second and third electrohydraulic proportional valves 22 and 23 are opened. If the driving pressure is not positive, the second and third valves 22 and 23 must be kept closed to avoid motion in the wrong direction, until the supply pressure Ps is increased to produce a positive driving pressure Peq.

Equations (2) and (3) can be used to determine the magnitude and direction of the external force acting on the piston rod 45.

The specific versions of the generic equations (6), (7), (9), (10) and (11) for the powered retraction mode are given by:

$$Kat = \frac{R^{3/2} KeqKsb}{\sqrt{Ksb^2 - Keq^2}} \quad (19)$$

$$Ksb = \frac{KatKeq}{\sqrt{Kat^2 - R^3 Keq^2}} \quad (20)$$

$$Kat = \mu Ksb \quad (21)$$

$$Kat = \sqrt{\mu^2 + R^3} \; Keq \quad (22)$$

$$Ksb = \frac{\sqrt{\mu^2 + R^3} \; Keq}{\mu} \quad (23)$$

Therefore, the valve conductance coefficients Ksb and Kat for the active second and third electrohydraulic proportional valves 22 and 23 are derived from equations (19)–(23). In order to operate the valves in the range of minimal sensitivity, either both equations (22) and (23) are solved or equation (23) is solved and the resultant valve conductance coefficient is used in equation (21) to derive the other valve conductance coefficient. In other circumstances the valve conductance coefficients can be derived using equation (19) or (20). For example a value for one valve conductance coefficient can be selected and the corresponding equation (19) or (20) used to derive the other valve conductance coefficient. The valve conductance coefficients Ksa and Kbt for the closed first and fourth electrohydraulic proportional valves 21 and 24 are set to zero. The resultant set of four valve conductance coefficients are supplied by the function controller 44 to valve drivers 60.

3. High Side Regeneration Mode

As an alternative to the powered extension and retraction modes, a function 20 can operate in a regeneration (regen) mode in which fluid being drained from one cylinder chamber is fed back through the valve assembly 25 to fill the other cylinder chamber. In a "High Side Regeneration Mode", the fluid flows from the rod chamber 27 to the head chamber 26 through supply line node "s".

When High Side Regeneration Mode is used to extend the piston rod 45, a smaller volume of fluid is exhausted from the rod chamber 27 than is required to power the larger head chamber 26. The additional fluid is fed to the function from the supply line 14 to supplement the fluid from the rod chamber 27. Thus, the pump 12 only has to furnish that relatively small additional amount of fluid to function 20 rendering the High Side Regeneration Mode more efficient in some cases than the Powered Extension Mode described previously.

The velocity of the rod extension is controlled by metering fluid through the first and second electrohydraulic proportional valves 21 and 22. The combined settings of the valve conductance coefficients Ksa and Ksb for those valves affect the velocity of the piston rod 45, given pressure Ps in the supply line 14 and an equivalent external force (Fx). Those valve conductance coefficients are derived by the function controller 44 by initially calculating the equivalent conductance coefficient (Keq) according to the equation:

$$Keq = \frac{\dot{x}Ab}{\sqrt{R(Ps-Pa)+(Pb-Ps)}}, \dot{x} > 0 \qquad (24)$$

It should be noted that Keq is linearly proportional to the commanded velocity.

The driving pressure, Peq, required for producing movement of the piston rod 45 is given by:

$$Peq = R(Ps-Pa)+(Pb-Ps) \qquad (25)$$

If the driving pressure is not positive, the first and second electrohydraulic proportional valves 21 and 22 must be kept closed to avoid motion in the wrong direction, until the supply pressure Ps is increased to produce a positive driving pressure Peq. It should be noted that in all of the metering modes the supply pressure does not always have to be greater that the cylinder inlet pressure for motion to occur in the correct direction as was commonly done in previous hydraulic systems. All the valves 21–24 in assembly 25 are held closed when a negative driving pressure exists.

The specific versions of the generic equations (6), (7), (9), (10) and (11) for the High Side Regeneration Mode are given by:

$$Ksa = \frac{R^{3/2}KsbKeq}{\sqrt{Ksb^2 - Keq^2}} \qquad (26)$$

$$Ksb = \frac{KsaKeq}{\sqrt{Ksa^2 - R^3 Keq^2}} \qquad (27)$$

$$Ksa = \mu Ksb \qquad (28)$$

$$Ksa = \sqrt{\mu^2 + R^3}\, Keq \qquad (29)$$

$$Ksb = \frac{\sqrt{\mu^2 + R^3}\, Keq}{\mu} \qquad (30)$$

The valve conductance coefficients Ksa and Ksb for the active first and second electrohydraulic proportional valves 21 and 22 are derived from equations (26)–(30). In order to operate the valves in the range of minimal sensitivity, either both equations (29) and (30) are solved or equation (30) is solved and the resultant valve conductance coefficient is used in equation (28) to derive the other valve conductance coefficient. In other circumstances the valve conductance coefficients can be derived using equation (26) or (27). For example, a value for one valve conductance coefficient can be selected and the corresponding equation (26) or (27) used to derive the other valve conductance coefficient. The valve conductance coefficients Kat and Kbt for the closed third and fourth electrohydraulic proportional valves 23 and 24 are set to zero. The resultant valve conductance coefficients are supplied by the function controller 44 to valve drivers 60.

4. Low Side Regeneration Mode

The exemplary machine hydraulic function 20 also can operate in a Low Side Regeneration Mode in which fluid being drained from one cylinder chamber is fed back through node "t" of the valve assembly 25 to fill the other cylinder chamber. The Low Side Regeneration Mode can be used to extend or retract the piston rod 45, and it is generally used when the external force is in the same direction as the desired movement. Even though Low Side Regeneration Mode does not require fluid to be supplied directly from the supply line 14, any additional fluid required to fill the head chamber 26 above that available from the rod chamber 27 comes via the tank return line 18 from fluid either exhausted from other functions 11 or flowing through the unloader valve 17.

The velocity of the rod is controlled by metering fluid through the third and fourth electrohydraulic proportional valves 23 and 24. The combined valve conductance coefficients Kat and Kbt for those valves affect the velocity of the piston rod 45, given the pressure Pr in the return line 18 and an equivalent external force (Fx). Those valve conductance coefficients are derived by the function controller 44 by initially calculating the equivalent conductance coefficient (Keq) according to one of the following equations, depending upon the direction x of the desired piston rod motion:

$$Keq = \frac{\dot{x}Ab}{\sqrt{R(Pr-Pa)+(Pb-Pr)}}, \dot{x} > 0 \qquad (31)$$

$$Keq = \frac{-\dot{x}Ab}{\sqrt{R(Pa-Pr)+(Pr-Pb)}}, \dot{x} < 0$$

The driving pressure, Peq, required for producing movement of the piston rod 45 is given by:

$$Peq = R(Pr-Pa)+(Pb-Pr), \dot{x} > 0$$

$$Peq = R(Pa-Pr)+(Pr-Pb), \dot{x} < 0 \qquad (32)$$

In either case, if the driving pressure is not positive, the third and fourth electrohydraulic proportional valves 23 and 24 must be kept closed to avoid motion in the wrong direction, until the return line pressure Pr is adjusted to produce a positive driving pressure Peq.

The specific versions of the generic equations (6), (7), (9), (10) and (11) for the Low Side Regeneration Mode are given by:

$$Kat = \frac{R^{3/2}KbtKeq}{\sqrt{Kbt^2 - Keq^2}} \qquad (33)$$

$$Kbt = \frac{KatKeq}{\sqrt{Kat^2 - R^3 Keq^2}} \qquad (34)$$

$$Kat = \mu Kbt \qquad (35)$$

$$Kat = \sqrt{\mu^2 + R^3}\, Keq \qquad (36)$$

$$Kbt = \frac{\sqrt{\mu^2 + R^3}\, Keq}{\mu} \qquad (37)$$

The valve conductance coefficients Kat and Kbt for the active third and fourth electrohydraulic proportional valves 23 and 24 are derived from equations (33)–(37). In order to operate the valves in the range of minimal sensitivity, either both equations (36) and (37) are solved, or equation (37) is solved and the resultant valve conductance coefficient is used in equation (35) to derive the other valve conductance coefficient. In other circumstances the valve conductance coefficients can be derived using equation (33) or (34). For example a value for one valve conductance coefficient can be selected and the corresponding equation (33) or (34) used to derive the other valve conductance coefficient. The valve conductance coefficients Ksa and Ksb for the closed first and second electrohydraulic proportional valves 21 and 22 are set to zero. The resultant valve conductance coefficients are supplied by the function controller 44 to valve drivers 60.

Actuator Port Pressure Control

An additional feature of the present invention is the ability to control the velocity of the function and have some control over one or both actuator port pressures simultaneously. For example, it is often possible to control velocity and a given single actuator port pressure. This pressure can be controlled to a specific value or limited to a maximum or minimum value. Alternatively, it is often possible to control the velocity of a function and limit both actuator port pressures simultaneously. This control method applies to all metering modes in the directions designated and can be used to operate both hydraulic cylinders and motors. In many circumstances, either the inlet or outlet pressure of the actuator may be controlled. Initially one or more desired pressures are defined for the actuator. This definition process utilizes a predefined "critical pressure" Pc. The critical pressure equals the desired pressure if there is only a single desired port pressure. Otherwise the critical pressure is the limiting actuator port pressure which is desirable. For example, the critical pressure may be a minimum pressure that is required to prevent cavitation in the actuator. Furthermore, more than one critical pressure can be defined as discussed later. A critical pressure associated with the head chamber is designated Pac. Likewise, a critical pressure associated with the rod chamber is designated Pbc. For each critical pressure specified, a critical value for the associated valve conductance coefficient, Kin_pc or Kout_pc, is computed using equation set (38) or (39) depending upon the metering mode and whether inlet or outlet port pressure control is desired.

Inlet Control Equation set (38):

Powered Extension $\quad$ $Kin\_pc = Ksa\_pc = \dfrac{|\dot{x}|Aa}{\sqrt{Ps-Pac}}, \dot{x} > 0$ Powered Retraction $\quad$ $Kin\_pc = Ksb\_pc = \dfrac{|\dot{x}|Ab}{\sqrt{Ps-Pbc}}, \dot{x} < 0$ High-Side Regen (Extend) $\quad$ $Kin\_pc = Ksa\_pc = \dfrac{|\dot{x}|Aa}{\sqrt{Ps-Pac}}, \dot{x} > 0$ Low-Side Regen Extend $\quad$ $Kin\_pc = Kat\_pc = \dfrac{|\dot{x}|Aa}{\sqrt{Pr-Pac}}, \dot{x} > 0$ Low-Side Regen Retract $\quad$ $Kin\_pc = Kbt\_pc = \dfrac{|\dot{x}|Ab}{\sqrt{Pr-Pbc}}, \dot{x} < 0$ Outlet Control Equation set (39):

Powered Extension $\quad$ $Kout\_pc = Kbt\_pc = \dfrac{|\dot{x}|Ab}{\sqrt{Pbc-Pr}}, \dot{x} > 0$ Powered Retraction $\quad$ $Kout\_pc = Kat\_pc = \dfrac{|\dot{x}|Aa}{\sqrt{Pac-Pr}}, \dot{x} < 0$ High-Side Regen (Extend) $\quad$ $Kout\_pc = Ksb\_pc = \dfrac{|\dot{x}|Ab}{\sqrt{Pbc-Ps}}, \dot{x} > 0$ Low-Side Regen Extend $\quad$ $Kout\_pc = Kbt\_pc = \dfrac{|\dot{x}|Ab}{\sqrt{Pbc-Pr}}, \dot{x} > 0$ Low-Side Regen Retract $\quad$ $Kout\_pc = Kat\_pc = \dfrac{|\dot{x}|Aa}{\sqrt{Pac-Pr}}, \dot{x} < 0$ Low-Side Regen Retract The critical valve coefficient value is that value of the valve conductance coefficient required to obtain the critical pressure in the specified port at the given cylinder velocity. An inlet pressure constraint line 74 or an outlet pressure constraint line 76 is delineated by two points on the graph of FIG. 4. The first point is at the origin and the second point is the intersection of the curve for the derived equivalent flow coefficient Keq with the line for the associated critical valve conductance coefficient. For example, for inlet pressure control, the second point is defined by the intersection of the desired Keq curve with the Kin=Kin_pc line. Similarly, if outlet pressure control is used, the second point is defined by the intersection of the desired Keq curve with the Kout=Kout_pc line. Operation on any point on the pressure constraint line will obtain the critical pressure at the corresponding actuator port. However, the operating point located at the intersection of the desired Keq curve and the pressure constraint line must be used to obtain both the desired velocity and the critical pressure.

In a first special case, the desired Keq curve and the line for the associated critical value conductance coefficient do not intersect. The critical port pressure cannot be obtained. In this case, the pressure constraint line is defined as a vertical or horizontal line that passes through the origin for inlet or outlet pressure control respectively. This first special case occurs when the appropriate equation in equation set (40) is satisfied.

Equation set (40):

Inlet Pressure Control $Kin\_pc < R^{1.5}Keq, \dot{x} > 0$ $Kin\_pc < Keq, \dot{x} < 0$ Outlet Pressure Control $Kout\_pc < Keq, \dot{x} > 0$ $Kout\_pc < R^{1.5}Keq, \dot{x} < 0$ Consider a second special case where the term under the square root in equation set (38) or (39) is not positive. Then the critical pressure cannot be obtained at any velocity. If inlet pressure control is being used, some pressures less than the critical pressure are obtainable. Conversely, if outlet pressure control is being used, some pressures greater than the critical pressure can be obtained. Whether the electro-hydraulic proportional valves 21–24 can be opened depends upon acceptability of the resulting workport pressures. However, this condition sometimes can be rectified by changing the pressure in the supply or return line 14 or 18, such that the term under the square root in equation set (38) or (39) becomes positive.

Figure 4:
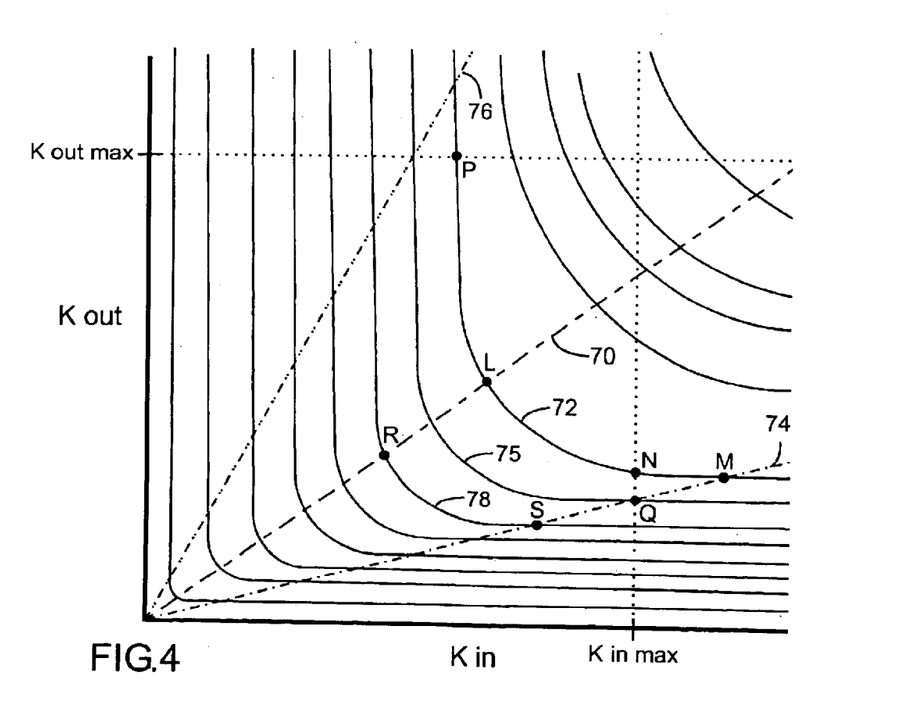
FIG. 4 depicts the relationship between flow coefficients Kin and Kout for individual valves in the hydraulic system and each solid line represents an equivalent conductance coefficient Keq.

Fortunately, a specific workport pressure usually is not required and a minimum pressure, a maximum pressure, or a pressure range is acceptable. If an operating point is selected above (or to the left of) a pressure constraint line in FIG. 4, the controlled pressure will be less than the associated critical pressure. Similarly, if an operating point below (or to the right of) a pressure constraint line in FIG. 4 is selected, the resulting pressure will be greater than the associated critical pressure. Whether operation above or below the pressure constraint line 74 or 76 is acceptable depends upon whether a pressure less than or greater than the critical pressure is satisfactory. If a range of workport pressures is acceptable, two pressure constraint lines can be defined, and the desired pressures can be obtained anywhere on or between those lines assuming a favorable overlapping region. At a given instant in time, the operating points in FIG. 4 that can be used to obtain the desired pressures as those that satisfy the defined pressure constraint(s). The pressure-constrained Keq curve is that portion of the Keq curve which satisfies the pressure constraint (i.e. that results in desired workport pressures). In some cases, it is not possible to obtain the commanded velocity and a desired workport pressure, while also operating on the preferred valve conductance coefficient line 70. The final operating point selected depends upon how the velocity control, workport pressure control and operation on the preferred conductance coefficient line are prioritized.

The value of Keq is computed from the desired velocity, as described previously. It is important to note that both Keq and the critical valve conductance coefficient(s) vary with changes in pressure and the desired velocity and are computed at each control instant. However, the pressure constraint lines 74 and 76 depend upon pressure, but are independent of velocity. Although workport pressures are measured near the electrohydraulic proportional valves in the preferred embodiment, accommodation can be made in the control method to compensate for line losses between each workport pressure sensor and the associated actuator port by selecting Pac and Pbc appropriately.

Cavitation Prevention

A preferred embodiment of the present invention controls the actuator inlet port pressure to prevent cavitation. The selection of any point on the desired Keq curve 72 in FIG. 4 achieves the commanded velocity, if cavitation does not occur. However, under certain conditions, cavitation can arise in some types of hydraulic actuators. Cavitation occurs when the forces acting on the actuator cause an actuator chamber to expand faster than fluid can be supplied to fill that chamber. This event is indicated by a significant negative gage pressure occurring in that actuator chamber. Cavitation can be avoided by ensuring that sufficient fluid is supplied to maintain a minimum positive pressure at the expanding actuator chamber. Assume that inlet port pressure control (for anti-cavitation) has greatest priority, then velocity control, and finally operation on the preferred valve conductance coefficient line 70. It is important to make pressure control the highest priority since the equations for velocity control (i.e. for Keq) are not accurate if cavitation occurs. Cavitation is prevented by satisfying the pressure constraint-that is by only operating at points on the pressure-constrained Keq curve (i.e. that portion of the Keq curve that is on or to the right of the pressure constraint line). In addition, the selected valve conductance coefficient pair may not lie on the preferred valve conductance coefficient line 70, since operating on this line may cause cavitation in some circumstances.

The critical pressure for the cylinder 16 is the minimum pressure that should be allowed to exist at the inlet port of the cylinder chamber in the selected metering mode. Therefore, the desired inlet pressures are greater than or equal to this critical pressure since cavitation can be prevented with higher pressures as well. The critical inlet pressure should be specified above zero gage pressure to account for line losses between the pressure sensor and the associated cylinder port where the pressure is to be controlled. The desired pressures and control priority for each metering mode of a given function are stored in the respective function controller 44.

Consider inlet pressure control with the understanding that analogous techniques apply for outlet pressure control. Assume that curve 72 represents the calculated equivalent conductance coefficient Keq, then that curve intersects the inlet pressure constraint line 74 to define point M and intersects the preferred valve conductance coefficient line 70 to define point L. Inlet control equation set (38) is used to compute Kin at point M (Kin=Kin_pc) and equations (10) and (11) are used to compute the values at point L. The inlet and outlet valves in assembly 25 have maximum valve conductance coefficients corresponding to the maximum amount that the respective valve can be opened. In this example, the maximum inlet and outlet valve conductance coefficients define two additional points N and P, respectively, on the selected equivalent conductance coefficient curve 72. In the first special case given previously (where equation (40) is satisfied), the inlet pressure constraint line 74 is vertical and no intersecting points M, Q, and S are defined. If the term under the square root in equation set (38) or (39) is not positive, all valves must be turned off to prevent cavitation.

The pressure constraint restricts operation to those points on or below (to the right of) the pressure constraint line 74. Therefore, the selected pressure constraint is applied to the calculated equivalent conductance coefficient curve 72, which results in only certain valve conductance coefficient pairs on the equivalent conductance coefficient curve 72 satisfying the inlet pressure constraint thereby forming a "pressure-constrained Keq curve segment". If the inlet pressure constraint line 74 is vertical, there is no pressure constraint since the critical pressure is always exceeded and the pressure-constrained Keq curve is actually the entire Keq curve.

When the pressure-constrained Keq curve segment is physically realizable (i.e. within the bounds of the maximum valve conductance coefficients), then valve conductance coefficients can be selected that produce both the desired speed and satisfy the desired pressure. If sensitivity minimization (i.e. operation on line 70) is not needed, then any physically-realizable operating point on the pressure-constrained Keq curve segment can be used.

When no portion of the pressure-constrained Keq curve segment is physically realizable, it is not possible to achieve both the desired speed and the desired inlet pressure. In this case, operation at any physically realizable point on the desired Keq curve would lead to cavitation (assuming the critical inlet port pressure is correctly specified).

It is desirable to select an operating point that lies on the preferred valve conductance coefficient line 70 to minimize velocity errors due to inaccuracies in the valve settings. If the pressure-constrained and physically realizable portion of the calculated equivalent conductance coefficient curve 72 intersects the preferred valve conductance coefficient line 70, the valves should be operated with valve coefficients corresponding to the intersecting point. Otherwise, the point on the pressure-constrained and physically realizable portion of the calculated equivalent conductance coefficient curve 72 that lays closest to that optimization point should be selected.

Once the Kin value of the desired operating point is determined, the calculated equivalent conductance coefficient Keq is used to derive the Kout value using equation (6) or (7).

In order to better understand workport pressure control, several specific examples of cavitation prevention using inlet port pressure control will be described with the understanding that other types of workport pressure control are analogous.

The respective equation (1), (17), (24) or (31) is first employed to compute the equivalent conductance coefficient Keq for the selected metering mode based on the desired velocity. In the cases discussed below, inlet actuator port pressure will be controlled to a critical value or higher so that cavitation is prevented. In addition, inlet actuator port pressure control has top priority, then velocity control, and finally minimization of velocity errors due to valve setting errors. The following cases apply to all of the metering modes.

Case 1

Consider the case in which the critical inlet valve conductance coefficient Kin_pc is greater than the maximum valve conductance coefficient value for the corresponding inlet electrohydraulic proportional valve in assembly 25. That is, the inlet valve can not be opened enough to achieve both the desired speed and the desired inlet port pressure. The inlet port pressure then is controlled to prevent cavitation and thus the desired velocity can not be obtained. To obtain a velocity that is closest to that which is desired, the inlet valve conductance coefficient Kin should be opened fully, i.e. have the maximum valve conductance coefficient. Then a revised equivalent valve conductance coefficient Keq_rev associated with that maximum valve conductance coefficient is calculated. This revised value is used to derive a valve conductance coefficient for the outlet electrohydraulic proportional valve in assembly 25.

For example, Kin is the conductance coefficient of the inlet electrohydraulic proportional valve and has a maximum value Kin_max indicated on the graph of FIG. 4. Assume that curve 72 corresponds to the computed equivalent conductance coefficient Keq and line 74 represents the pressure constraint line. Therefore, the requested operating point is designated by the letter M. However, point M designates an input valve conductance coefficient Kin which is greater than the maximum value that can be obtained (i.e. greater than Kin_max) with that specific electrohydraulic proportional valve, and thus operation at point M is not possible.

Point N corresponds to the point on the designated Keq curve 72 at the maximum value (Kin_max) for the valve conductance coefficient Kin. However, operation at point N, while appearing to produce the requested piston rod velocity, does not guarantee that cavitation will not occur as the inlet cylinder pressure would be below the critical pressure because the operating point N is above the inlet pressure constraint line 74. Since inlet cylinder pressure control has priority over velocity control in these examples, operation at point N is unacceptable. Therefore it is necessary to reduce the velocity just enough so that a desired inlet pressure can be obtained.

In order to avoid cavitation, the operating point must lay on or below the inlet pressure constraint line 74. Operation at any physically realizable point below the pressure constraint line 74 is possible here though not optimal because the requested speed is reduced more than necessary. In the present case, operation at point Q is optimal in the sense that it achieves as close to the commanded velocity as possible while maintaining a desired (i.e. critical) inlet cylinder pressure to preclude cavitation. Thus, in this case the valve conductance coefficient for the inlet valve is set to its maximum value, Kin_max.

Quantitatively, equation (41) is employed to compute the revised equivalent conductance coefficient Keq_rev, as indicated by curve 75, using the maximum value of the inlet valve conductance coefficient Kin_max.

$$\text{Keq\_rev} = \frac{\text{Kin\_max}}{\text{Kin\_pc}} Keq \qquad (41)$$

The point on the Keq_rev curve corresponding to the maximum inlet valve coefficient value, Kin_max, defines the operating point Q, at which the (critical) inlet pressure can be obtained. Point Q also lies on the pressure constraint line 74. This is graphically equivalent to moving the operating point from point M to point Q in FIG. 4. Finally, equation (6) or (7) is employed to determine the valve conductance coefficient Kout for the outlet electrohydraulic proportional valve in assembly 25. It is important to note that in this case operation along the preferred valve conductance coefficient line 70 is not an option at any speed since a desired cylinder inlet pressure cannot be maintained at points along that line. The velocity is reduced by the same ratio as the equivalent conductance coefficient.

Analogously, consider the case when a maximum outlet port pressure is specified, Kout_pc exceeds Kout_max, and outlet port pressure control has priority over velocity control or valve error minimization. Then, the outlet valve conductance coefficient is set to its maximum value Kout_max. Next, equation (42) is used to compute the revised equivalent conductance coefficient using the maximum value of the valve conductance coefficient Kout for the outlet valve.

$$\text{Keq\_rev} = \frac{\text{Kout\_max}}{\text{Kout\_pc}} Keq \qquad (42)$$

Equation (6) or (7) then is used to derive the inlet valve conductance coefficient. The desired velocity cannot be obtained and is reduced by the same ratio that Keq is reduced in equation (42).

Case 2

In another situation, the critical inlet valve conductance coefficient (Kin_pc) required to obtain the critical workport pressure may be greater than the optimum inlet valve conductance coefficient (Kin_opt) and less than the maximum coefficient value (e.g. Kin_max) for that electrohydraulic proportional valve. Now, both the desired inlet cylinder pressure and commanded velocity are achievable. However, since the optimum coefficient value Kin_opt is less than coefficient Kin_pc (i.e. the preferred coefficient line is above the pressure constraint line), it is not possible to operate on the preferred valve conductance coefficient line 70 and still achieve the desired inlet port pressure.

With continuing reference to FIG. 3, assume that the equivalent conductance coefficient Keq is represented by curve 78. Thus operation at point R on the preferred valve conductance coefficient line 70 may appear to achieve the desired velocity but not with a desired inlet port pressure since point R is above the pressure constraint line 74. In reality, since cavitation would probably occur, the desired velocity probably would not even be obtained. Point S, defined by the intersection of the Keq curve 78 and the pressure constraint line 74, corresponds to an operating point that achieves both the commanded velocity and a desired inlet pressure. Therefore, the values for the valve conductance coefficients Kin and Kout designated by point S are selected. Specifically, the appropriate equation in set (38) for the selected metering mode is used to determine the coefficient for the inlet valve conductance coefficient and then equation (6) or (7) is employed to derive the outlet valve conductance coefficient.

Case 3

The third case occurs when the inlet valve conductance coefficient Kin_pc required to obtain the critical workport pressure is less than the optimum value Kin_opt required to minimize velocity errors. This includes the special case where equation (40) is satisfied. Here, a desired inlet cylinder pressure, the commanded velocity, and the optimum valve conductance coefficients all can be obtained. Operation now occurs at a point defined by the intersection of the preferred valve conductance coefficient line 70 and the given Keq curve 72 (i.e. point L). The valve conductance coefficients are calculated using equations (10) and (11).

Case 4

When the term under the square root in equation (38) is not positive, all valves must be closed since a desired workport pressure cannot be obtained.

Other Types of Actuator Port Pressure Limiting

Limiting actuator port pressures to a given maximum value is another feature of the present invention. In this case, operation is restricted to the region on or above (i.e. left) of this pressure constraint line so that the maximum port pressure is not exceeded. In yet another embodiment, inlet pressure can be limited to prevent cavitation while outlet pressure is limited to some maximum value. In this embodiment, a pressure constraint line is defined for each workport. Then, operation is restricted to the region on or below the inlet pressure constraint line and on or above the outlet pressure constraint line. The region of the Keq curve that satisfies both these pressure constraints is then the pressure-constrained Keq curve.

In summary, the present method controls one or both actuator port pressures, the velocity of the actuator, and can be used to reduce velocity errors due to non-ideal electrohydraulic proportional valves. In cases in which all of these requirements cannot be obtained, selected ones are achieved on a predefined priority basis.

Supply and Return Pressure Control

In order to achieve the commanded velocity $\dot{x}$, the pressure controller 48 operates the unloader valve 17 to produce a pressure level in the supply line 14 which meets the fluid supply requirement of the cylinder 16 in function 20, as well as the other hydraulic functions of the machine. For that purpose, the system controller 46 executes a setpoint routine 62 which determines a separate pump supply pressure setpoint (Ps setpoint) to meet the needs of each active machine function operating in the Powered Extension, Powered Retraction, or High Side Regeneration modes. Because these modes do not draw any fluid from the return line 18, the return pressure setpoint (Pr setpoint) is set to a value corresponding to minimum pressure.

The setpoint routine 62 similarly calculates a return line pressure setpoint for each function of the hydraulic system 10 that is operating in the Low Side Regeneration mode. The pump supply pressure setpoint associated with this mode is set to zero.

From the individual function setpoints, the system controller 46 selects the supply line pressure setpoint (Ps setpoint) having the greatest value and the return line pressure setpoint (Pr setpoint) having the greatest value. Those selected greatest values are sent to the pressure controller 48 as the commanded supply and return line pressure setpoints.

The pressure controller 48 controls the pressure in the supply line 14 such that the actual pressure approximates the supply line pressure setpoint (Ps setpoint). When a variable displacement pump is employed, the pressure setpoint is used to control the pump so that the desired supply pressure is produced.

The pressure control routine 64 also operates the tank control electrohydraulic proportional valve 19 to achieve the desired pressure in the tank return line 18, as indicated by return line pressure setpoint (Pr setpoint). Specifically, the pressure control routine 64 governs the closing of the tank control valve 19 to restrict the flow into the tank 15 as necessary to increase pressure in the tank return line 18. Restriction of the flow into the tank 15 is used to increase the pressure within the tank return line when one of the functions of the hydraulic system 10 is extending in the Low Side Regeneration Mode.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A method of controlling an electrohydraulic valve that controls flow of fluid which operates a hydraulic actuator, said method comprising:
   specifying desired movement of the hydraulic actuator;
   sensing a parameter which indicates a force acting on the hydraulic actuator;
   deriving a valve flow coefficient which characterizes fluid flow through the electrohydraulic valve, wherein the valve flow coefficient is derived from the desired movement and the parameter
   in response to the valve flow coefficient, producing a valve activation signal representing an amount that the electrohydraulic valve is to open; and
   activating the electrohydraulic valve based on the valve activation signal.

2. The method as recited in claim 1 wherein specifying the desired movement specifies a desired velocity for the hydraulic actuator.

3. The method as recited in claim 1 wherein sensing a parameter comprises sensing a fluid pressure produced by the force acting on the hydraulic actuator.

4. The method as recited in claim 1 wherein the electrohydraulic valve is connected to one of a supply line containing pressurized fluid and a return line connected to a tank, and further comprises:
   sensing at least one of pressure in the supply line and pressure in the return line to produce a pressure measurement set; and
   wherein deriving a valve flow coefficient also is derived from the pressure measurement set.

5. The method as recited in claim 1 wherein the electrohydraulic valve is connected with the hydraulic actuator in a hydraulic circuit branch which is connected between a supply line containing pressurized fluid and a return line connected to a tank, and further comprises:
   deriving an equivalent flow coefficient which characterizes fluid flow in the hydraulic circuit branch; and
   wherein the valve flow coefficient is derived from the equivalent flow coefficient.

6. The method as recited in claim 5 further comprising:
   sensing pressure in the supply line to produce a supply pressure measurement;
   sensing pressure in the return line to produce a return pressure measurement; and
   wherein deriving the equivalent flow coefficient is based on the supply pressure measurement, the return pressure measurement, and the parameter.

7. The method as recited in claim 5:
   wherein specifying the desired movement specifies a desired velocity for the hydraulic actuator; and further comprising:
   sensing pressure in the supply line to produce a supply pressure measurement;
   sensing pressure in the return line to produce a return pressure measurement; and
   deriving the equivalent flow coefficient, which characterizes fluid flow in the hydraulic circuit branch, based on the desired velocity, the parameter, and at least one of the supply pressure measurement and the return pressure measurement.

8. The method as recited in claim 1 wherein activating the electrohydraulic valve comprises determining a level of electric current based on the valve flow coefficient; and applying electric current at that level to the electrohydraulic valve.

9. A method for controlling a hydraulic actuator that has a first port and a second port wherein the hydraulic actuator is part of a circuit branch that includes a first electrohydraulic proportional valve coupling the first port to a supply line containing pressurized fluid and a second electrohydraulic proportional valve coupling the second port to a return line connected to a tank, said method comprising:

requesting a desired velocity for the hydraulic actuator;

sensing a parameter which varies with changes of a force acting on the hydraulic actuator;

employing the desired velocity and the parameter to derive a first value for a first valve flow coefficient which characterizes fluid flow through the first electrohydraulic proportional valve, and to derive a second value for a second valve flow coefficient which characterizes fluid flow through the second electrohydraulic proportional valve;

in response to the first value for the first valve flow coefficient, producing a first valve activation signal representing an amount that the first electrohydraulic proportional valve is to open;

in response to the second value for the second valve flow coefficient, producing a second valve activation signal representing an amount that the second electrohydraulic proportional valve is to open;

activating the first electrohydraulic proportional valve based on the first valve activation signal; and activating the second electrohydraulic proportional valve based on the second valve activation signal.

10. The method as recited in claim 9 further comprising defining a preferred relationship between the first valve flow coefficient and the second valve flow coefficient.

11. The method as recited in claim 10 wherein the preferred relationship is given by the expression Ka=$\mu$Kb, where Ka is one of the first and second valve flow coefficients, Kb is the other one of the first and second valve flow coefficients, and $\mu$ is a constant of proportionality.

12. The method as recited in claim 10 wherein the first value derived for the first valve flow coefficient and the second value derived for the second valve flow coefficient satisfy the preferred relationship.

13. The method as recited in claim 9 further comprising:

defining a preferred relationship between the first valve flow coefficient and the second valve flow coefficient;

defining desired pressure for one of the first port and the second port; and wherein the first value for the first valve flow coefficient and the second value for the second valve flow coefficient are derived using a priority system in which:

a first priority is to select a first value and a second value which achieve the desired pressure, the desired velocity and the preferred relationship, but if such values do not exist then;

a second priority is to select a first value and a second value which achieve the desired pressure and the desired velocity, but if such values do not exist then;

a third priority is to select a first value and a second value which achieve the desired pressure.

14. The method as recited in claim 9 further comprising specifying a critical pressure for the first port; and determining a critical value for the first valve flow coefficient based on the critical pressure.

15. The method as recited in claim 14 wherein the critical value for the first valve flow coefficient is derived from the critical pressure, the pressure in the supply line, and the desired velocity.

16. The method as recited in claim 14 wherein the critical value Kpc for the first valve flow coefficient is determined according to the expression:

$$Kpc = \frac{|\dot{x}|A}{\sqrt{Ps - Pc}}$$

where Pc is the critical pressure, Ps is pressure in the supply line, $\dot{x}$ is the desired velocity, and A is a surface area of the hydraulic actuator on which fluid acts.

17. The method as recited in claim 16 wherein the hydraulic actuator is a cylinder and piston combination, and A is an area of the piston in a chamber of the cylinder to which the first port connects.

18. The method as recited in claim 14 wherein:

the first value for the first valve flow coefficient is derived based on the desired velocity and the critical value; and the second value for the second valve flow coefficient based on the first value for the first valve flow coefficient.

19. The method as recited in claim 14 wherein when the critical value is greater than a maximum value for the first valve flow coefficient of the first electrohydraulic proportional valve, the first value for the first valve flow coefficient and the second value for the second valve flow coefficient are derived by:

setting the first value to the maximum value for the first valve flow coefficient;

calculating a revised equivalent flow coefficient that is obtainable with the first value set to the maximum value for the first valve flow coefficient, wherein the revised equivalent flow coefficient characterizes fluid flow, in a hydraulic circuit branch comprising the hydraulic actuator, first electrohydraulic proportional valve, and the second electrohydraulic proportional valve; and deriving the second value for the second valve flow coefficient based on the revised equivalent flow coefficient.

20. The method as recited in claim 14 wherein employing the desired velocity and the parameter to derive the first value and the second value comprises:

employing the desired velocity and the parameter to derive an equivalent flow coefficient which characterizes fluid flow in the circuit branch;

using the equivalent flow coefficient to derive the first value for the first valve flow coefficient;

when the first value is greater than a maximum possible value for the first valve flow coefficient, setting the first value to the maximum possible value; calculating a revised equivalent flow coefficient that is obtainable with the first value set to the maximum possible value for the first valve flow coefficient; and deriving the second value for the second valve flow coefficient based on the revised equivalent flow coefficient.

21. The method as recited in claim 20 wherein the revised equivalent flow coefficient Ke_rev is calculated according the expression:

$$Keq\_rev = \frac{Kmax}{Kpc} Keq$$

where Kmax is the maximum value of the first valve flow coefficient, Kpc is critical value for the first valve flow coefficient, and Keq is the equivalent flow coefficient.

22. The method as recited in claim 14:
further comprising defining a preferred relationship between the first valve flow coefficient and the second valve flow coefficient; and
wherein when the critical value is less than a maximum value of the first valve flow coefficient and greater than a value that satisfies the preferred relationship, the first valve flow coefficient and the second valve flow coefficient are derived by:
deriving the first value for the first valve flow coefficient based on the desired velocity and the critical pressure; and
deriving the second value for the second valve flow coefficient based on the first value of the first valve flow coefficient.

23. The method as recited in claim 9 further comprising specifying a critical pressure for the second port; and determining a critical value for the second valve flow coefficient based on the critical pressure.

24. The method as recited in claim 23 wherein the critical value for the second valve flow coefficient is derived from the critical pressure, the pressure in the return line, and the desired velocity.

25. The method as recited in claim 24 wherein the critical value Kpc for the second valve flow coefficient is determined according to the expression:

$$Kpc = \frac{|\dot{x}|A}{\sqrt{Pc - Pr}}$$

where Pc is the critical pressure, Pr is pressure in the return line, $\dot{x}$ is the desired velocity, and A is a surface area of the hydraulic actuator.

26. The method as recited in claim 25 wherein the hydraulic actuator is a cylinder and piston combination, and A is an area of the piston in a chamber of the cylinder to which the second port connects.

27. The method as recited in claim 23 wherein:
the second value for the second valve flow coefficient is derived based on the desired velocity and the critical value; and
the first value for the first valve flow coefficient is derived based on the second value.

28. The method recited in claim 23 wherein when the critical value is greater than a maximum value for the second valve flow coefficient, the first value for the first valve flow coefficient and the second value for the second valve flow coefficient are derived by:
setting the second value to the maximum value for the second valve flow coefficient;
calculating a revised equivalent flow coefficient that is obtainable with the second value set to the maximum value for the second valve flow coefficient, wherein the revised equivalent flow coefficient characterizes fluid flow in a hydraulic circuit branch which comprises the hydraulic actuator, first electrohydraulic proportional valve, and the second electrohydraulic proportional valve; and
deriving the first value for the first valve flow coefficient based on the revised equivalent flow coefficient.

29. A method for controlling fluid flow in a circuit branch which has a hydraulic actuator with a first port to which a first electrohydraulic proportional valve is connected and a second port to which a second electrohydraulic proportional valve is connected, said method comprising:
requesting a desired velocity for the hydraulic actuator;
producing an indication of how much force is acting on the hydraulic actuator;
employing the desired velocity and the indication to derive a first value for a first valve flow coefficient which characterizes fluid flow through the first electrohydraulic proportional valve, and a second value for a second valve flow coefficient which characterizes fluid flow through the second electrohydraulic proportional valve;
in response to the first value for the first valve flow coefficient, producing a first valve activation signal representing an amount that the first electrohydraulic proportional valve is to open;
in response to the second value for the second valve flow coefficient, producing a second valve activation signal representing an amount that the second electrohydraulic proportional valve is to open;
activating the first electrohydraulic proportional valve based on the first value for the first valve activation signal; and
activating the second electrohydraulic proportional valve based on the second value for the second valve activation signal.

30. The method as recited in claim 29 further comprising defining a preferred relationship between the first valve flow coefficient and the second valve flow coefficient; and wherein the first value derived for the first valve flow coefficient and the second value derived for the second valve flow coefficient satisfy the preferred relationship.

31. The method as recited in claim 29 further comprising specifying a critical pressure for the first port; and wherein the first value for the first valve flow coefficient is derived based on the desired velocity and the critical pressure; and the second value for the second valve flow coefficient based on the first value for the first valve flow coefficient.

32. The method as recited in claim 29 wherein the first electrohydraulic proportional valve and the second electrohydraulic proportional valve are connected to a return line connected to a tank; and further comprising:
specifying a critical pressure Pc for the first port;
determining a critical value Kpc for the first valve flow coefficient according to the expression:

$$Kpc = \frac{|\dot{x}|A}{\sqrt{Pr - Pc}}$$

where Pr is pressure in the return line, $\dot{x}$ is the desired velocity, and A is a surface area of the hydraulic actuator on which fluid acts.

33. The method as recited in claim 29 wherein the first electrohydraulic proportional valve and the second electrohydraulic proportional valve are connected to a return line connected to a tank; and further comprising:
specifying a critical pressure Pc for the second port;
determining a critical value Kpc for the second valve flow coefficient according to the expression:

$$Kpc = \frac{|\dot{x}|A}{\sqrt{Pc - Pr}}$$

where Pr is pressure in the return line, $\dot{x}$ is the desired velocity, and A is a surface area of the hydraulic actuator on which fluid acts.

34. The method as recited in claim 29 wherein the first electrohydraulic proportional valve and the second electrohydraulic proportional valve are connected to a supply line containing pressurized fluid; and further comprising:

specifying a critical pressure Pc for the first port;
determining a critical value Kpc for the first valve flow coefficient according to the expression:

$$Kpc = \frac{|\dot{x}|A}{\sqrt{Ps - Pc}}$$

where Ps is pressure in the supply line, $\dot{x}$ is the desired velocity, and A is a surface area of the hydraulic actuator on which fluid acts.

35. The method as recited in claim 29 wherein the first electrohydraulic proportional valve and the second electrohydraulic proportional valve are connected to a supply line containing pressurized fluid; and further comprising:
specifying a critical pressure Pc for the second port;
determining a critical value Kpc for the second valve flow coefficient according to the expression:

$$Kpc = \frac{|\dot{x}|A}{\sqrt{Pc - Ps}}$$

where Ps is pressure in the supply line, $\dot{x}$ is the desired velocity, and A is a surface area of the hydraulic actuator on which fluid acts.

36. In a hydraulic system having a circuit branch in which a first electrohydraulic proportional valve couples a first port of a hydraulic actuator to a supply line containing pressurized fluid, and a second electrohydraulic proportional valve couples a second port of the hydraulic actuator to the supply line, a third electrohydraulic proportional valve couples the first port to a return line connected to a tank, and a fourth electrohydraulic proportional valve couples the second port to the return line, a method for controlling the hydraulic actuator comprising:
designating a direction in which the hydraulic actuator is to move;
designating a commanded speed at which the hydraulic actuator is to move;
selecting a pair of the first, second, third and fourth electrohydraulic proportional valves to be operated to produce movement of the hydraulic actuator in the direction that is designated;
sensing pressure in the supply line to produce a supply pressure measurement;
sensing pressure in the return line to produce a return pressure measurement;
sensing pressure at the first port to produce a first port pressure measurement;
sensing pressure at the second port to produce a second port pressure measurement;
deriving an equivalent flow coefficient, Keq, characterizing fluid flow in the hydraulic circuit branch, wherein the equivalent flow coefficient is based on the commanded speed and selected ones of the supply pressure measurement, the return pressure measurement, the first port pressure measurement and the second port pressure measurement;
deriving valve flow coefficients for the pair of the first, second, third, and fourth electrohydraulic proportional valves based on the equivalent flow coefficient; and
activating the pair of the first, second, third and fourth electrohydraulic proportional valves in response to the valve flow coefficients to move the hydraulic actuator in the direction that is designated.

37. The method as recited in claim 36 wherein the hydraulic actuator has a surface area which is exposed to the pressure at the first port; and the method further comprises specifying a critical pressure for the first port.

38. The method as recited in claim 37 wherein deriving valve flow coefficients derives a valve flow coefficient for the first electrohydraulic proportional valve based on the commanded speed, the surface area, the supply pressure measurement, and the critical pressure.

39. The method as recited in claim 37 wherein deriving valve flow coefficients derives a valve flow coefficient for the third electrohydraulic proportional valve based on the commanded speed, the surface area, the return pressure measurement, and the critical pressure.

40. The method as recited in claim 36 wherein the hydraulic actuator has a surface area which is exposed to the pressure at the second port; and the method further comprises specifying a critical pressure for the second port.

41. The method as recited in claim 40 wherein deriving valve flow coefficients derives a valve flow coefficient for the second electrohydraulic proportional valve based on the commanded speed, the surface area, the supply pressure measurement, and the critical pressure.

42. The method as recited in claim 40 wherein deriving valve flow coefficients derives a valve flow coefficient for the fourth electrohydraulic proportional valve based on the commanded speed, the surface area, the return pressure measurement, and the critical pressure.

43. The method as recited in claim 36 wherein when one of the valve flow coefficients that is derived is greater than a maximum value for that one valve flow coefficient, the method further comprises:
setting the one valve flow coefficient to the maximum value;
calculating a revised equivalent flow coefficient that is obtainable with the one valve flow coefficient set to the maximum value, wherein the revised equivalent flow coefficient characterizes fluid flow in a hydraulic circuit branch which comprises the hydraulic actuator, first electrohydraulic proportional valve, and the second electrohydraulic proportional valve; and
deriving a valve flow coefficient for the other one of the pair of the first, second, third, and fourth electrohydraulic proportional valves based on the revised equivalent flow coefficient.

44. The method as recited in claim 43 further comprising:
specifying a critical pressure for one of the first port and the second port;
determining the critical value Kpc for the one valve flow coefficient based on the critical pressure; and
wherein the revised equivalent flow coefficient Keqjev satisfies the expression:

$$Keq\_rev = \frac{Kmax}{Kpc} Keq$$

where Kmax is the maximum value, and Keq is the equivalent flow coefficient.

45. The method as recited in claim 36 further comprising:
in response to the valve flow coefficients, producing valve activation signals representing an amount that the pair of the first, second, third, and fourth electrohydraulic proportional valves is to open; and
wherein activating the pair of the first, second, third and fourth electrohydraulic proportional valves is in response to the valve activation signals.

* * * * *

UNITED STATES PATENT AND TRADEMARK OFFICE
CERTIFICATE OF CORRECTION

PATENT NO. : 6,775,974 B2
DATED : August 17, 2004
INVENTOR(S) : Keith A. Tabor It is certified that error appears in the above-identified patent and that said Letters Patent is hereby corrected as shown below:

Column 28,
Line 49, "Keqjev" should be -- Keq_rev --.

Signed and Sealed this

Tenth Day of May, 2005

JON W. DUDAS
*Director of the United States Patent and Trademark Office*